(No Model.)
H. M. KELLER.
VEHICLE AXLE.
No. 261,463.  Patented July 18, 1882.
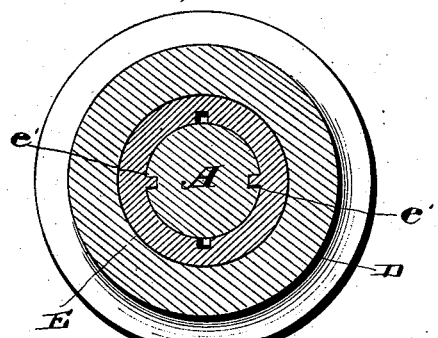
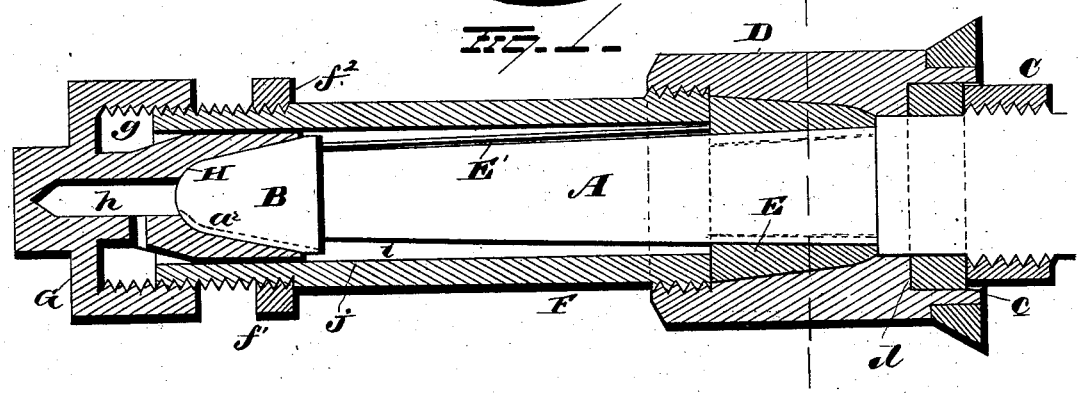
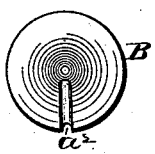
WITNESSES
INVENTOR
Henry M. Keller
Attorney

UNITED STATES PATENT OFFICE.

HENRY M. KELLER, OF NEWARK, OHIO.

VEHICLE-AXLE.

SPECIFICATION forming part of Letters Patent No. 261,463, dated July 18, 1882.

Application filed May 29, 1882. (No model.)

*To all whom it may concern:*

Be it known that I, HENRY M. KELLER, of Newark, in the county of Licking and State of Ohio, have invented certain new and useful Improvements in Hubs and Axles; and I do hereby declare the following to be a full, clear, and exact description of the invention, such as will enable others skilled in the art to which it pertains to make and use the same.

My invention relates to a combined axle, box, and nut, the object being to provide a device of this character of such construction that the wear and lost motion caused by the frictional contact of the parts may be compensated for.

A further object of the invention is to provide a combined axle, box, and nut of such construction as to admit of the self-lubrication of the parts without leakage of the lubricant.

The invention consists in the improved construction and combinations of parts hereinafter fully described, and pointed out in the claims.

In the drawings, Figure 1 represents a vertical central section of an axle spindle, box, and nut constructed in accordance with my invention. Figs. 2 and 3 represent parts in detail.

A represents an axle-spindle, tapering from its inner to its outer end, and provided at its outer end with an oval-shaped head, B, to form a journal on the outer end of the spindle.

C represents a nut, interiorly threaded, to be secured to the inner end of the spindle. A sleeve, D, is secured upon the inner end of the spindle and provided with an annular interior shoulder, $d$. Between the latter and the nut C are interposed any desired number of washers, $c$. The sleeve D, on the outer side of the shoulder $d$, is tapering from its outer to its inner end to receive a conical collar, E, which latter is interiorly provided on opposite sides with ribs $e$, adapted to fit into corresponding grooves, $e'$, formed on the axle-spindle. Said collar E is held stationary by a longitudinal brace, E', and forms a tapering bearing for the axle. The outer surface of the collar E is provided with longitudinal grooves $f$ to allow the passage of oil between said collar and the sleeve D. The outer end of the sleeve D is interiorly threaded to receive the inner end of a cylindrical box, F, which slips upon the spindle A, and is screw-threaded at its outer end, $f'$, to receive a collar, $f^2$, which holds the box within the hub, and a nut, G. Projecting centrally from the interior of the nut G is an oval-shaped cup or bearing, H, adapted to receive the oval-shaped head B of the spindle A. The head B is longitudinally grooved to form oil-passages $a^2$. The parts thus formed and connected leave an oil-chamber, $i$, between the spindle A and the box F. The interior of the nut G is also provided with an annular oil-space, $g$, and a central oil-space, $h$. The box F is formed with a perforation, $j$, to admit oil between the box and the spindle. When the journal-bearings of the spindle become unduly worn the nut G is screwed farther onto the box F to compensate for such wear; also, by turning the nut C the sleeve D and its washers may be adjusted to compensate for wear.

The oil-receptacles enable the parts to be kept well lubricated without frequent renewals of oil, and the construction and connection of the parts are such that all leakage of oil is avoided.

I do not limit myself to the precise construction shown and described, as many modifications and alterations in form and construction may be resorted to without departing from the spirit of my invention.

Having fully described my invention, what I claim as new, and desire to secure by Letters Patent, is—

1. The combination, with a spindle and axle-box, of a nut provided with oil-chambers and a cup-bearing and adapted to be adjusted to compensate for wear on the parts, substantially as and for the purpose set forth.

2. The combination, with the spindle and axle-box inclosing the latter, of a nut provided with an oval-shaped cup to receive the head of the spindle, and adapted to be adjusted upon the box to compensate for wear on the journals and bearings, substantially as and for the purpose set forth.

3. The combination, with a spindle provided with an oval-shaped head having longitudinal grooves, of a cylindrical box inclosing the spindle and provided with an oil-opening, and a nut adapted to be screwed onto the outer end of the box, and provided with oil-chambers, and a conical cup or bearing, substantially as and for the purpose set forth.

4. The combination, with an axle-spindle provided with an oval-shaped outer end, of a sleeve secured upon the inner end of the spindle and provided interiorly with an annular shoulder and a tapering bearing, a conical collar adapted to said bearing, a box inclosing the spindle, and a nut provided with oil-chambers, as shown, and an oval-shaped cup or bearing to receive the outer end of the spindle and adapted to be screwed onto the outer end of the box, substantially as and for the purpose set forth.

5. The combination, with spindle, of a sleeve provided with an interior shoulder and a tapering bearing, a nut arranged on the inner side of said sleeve, and washers interposed between said sleeve and nut, a tapering collar provided with interior longitudinal ribs, which engage corresponding grooves of the spindle, and with exterior grooves for the passage of oil, a longitudinal brace to retain said collar in place, a box inclosing the spindle and screwed into the outer end of the sleeve, and an outer nut screwed onto the outer end of the box, substantially as and for the purpose set forth.

In testimony whereof I have signed this specification in the presence of two subscribing witnesses.

HENRY MILLER KELLER.

Witnesses:
JACOB M. SHROCK,
JAMES McCRUM.